United States Patent [19]

Nguyen et al.

[11] Patent Number: 4,652,415

[45] Date of Patent: Mar. 24, 1987

[54] METHOD OF MANUFACTURE OF A MOLDED FRICTION PAD

[75] Inventors: Chinh T. Nguyen; Stanley E. Smith, both of Dayton, Ohio

[73] Assignee: General Motors Corporation, Detroit, Mich.

[21] Appl. No.: 700,282

[22] Filed: Feb. 11, 1985

[51] Int. Cl.⁴ .............................................. B29C 71/02
[52] U.S. Cl. .................................. 264/236; 264/250; 264/255; 264/273; 264/275; 264/278
[58] Field of Search ............ 264/248, 251, 257, 271.1, 264/273, 275, 278, 250, 255, 236; 188/250 B, 251 A, 251 R, 73.1

[56] References Cited

U.S. PATENT DOCUMENTS

| | | | |
|---|---|---|---|
| 2,845,378 | 7/1958 | Dereich | 264/248 |
| 3,000,772 | 9/1961 | Lunn | 154/52.5 |
| 3,595,700 | 7/1971 | Rosansky | 264/273 |
| 4,100,248 | 7/1978 | Adams | 264/273 |
| 4,295,256 | 10/1981 | Pascal | 264/251 |

Primary Examiner—Donald Czaja
Assistant Examiner—Jennifer E. Cabaniss
Attorney, Agent, or Firm—Donald F. Scherer

[57] ABSTRACT

A method of forming a friction pad utilizing two distinct compounds. One of the compounds has a high fiber content and the other has a high flow characteristic. The compounds are placed in respective layers in a mold and are compressed to form a composite piece which is placed in a second mold cavity along with a perforated metal plate. Heat and pressure are then applied to the composite piece in the second mold cavity to cause the high flow characteristic compound to flow and enclose the metal plate such that the two compounds and the metal plate are firmly bonded into an integral friction pad.

4 Claims, 11 Drawing Figures

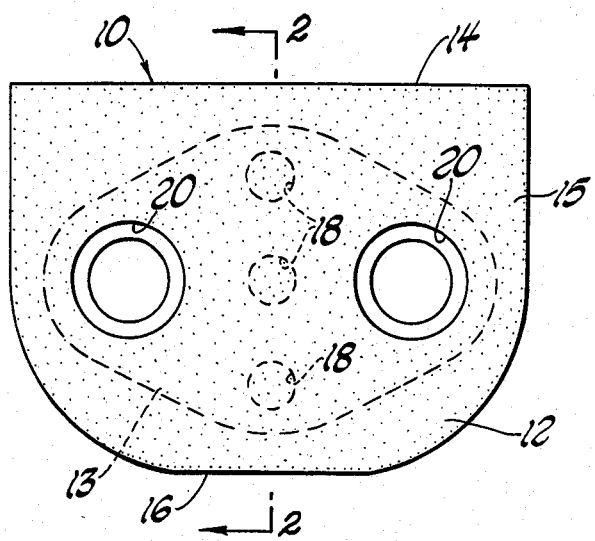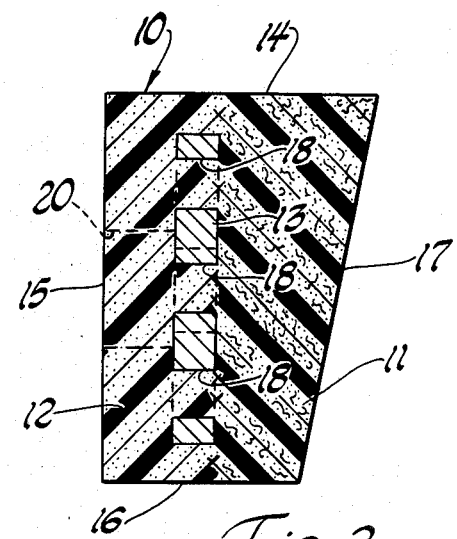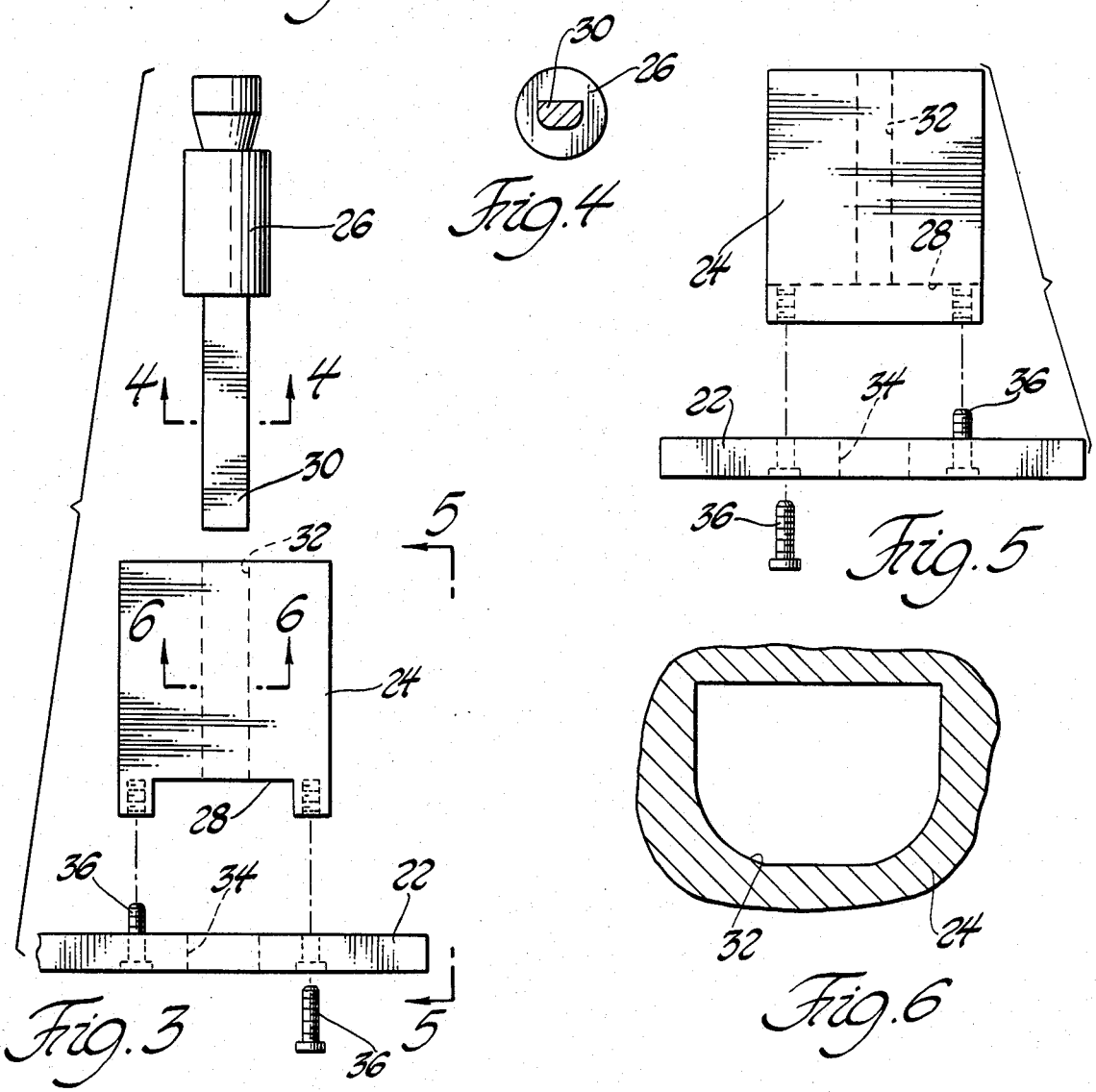

METHOD OF MANUFACTURE OF A MOLDED FRICTION PAD

This invention relates to methods of forming friction pads and more particularly to a method of forming a friction pad with a metal insert.

Prior art friction pads for use with pulley drive mechanisms, are generally formed independently of a metal member and then either mechanically or chemically bonded to a metal backing plate for attachment with the main body of a drive chain. While such structures are effective in operation, they can become inoperative due to the friction pad being separated from the backing place as a result of failure at the bonded interface.

The present invention seeks to overcome this disadvantage by providing a single unitary structure incorporating both the friction pad and the metal backing plate. The invention provides a method of simultaneously molding a friction compound and a metal plate such that the metal plate is completely embedded or encased by the friction material. The friction pad is comprised of two compounds, one of which has a hot flow characteristic permitting it to free flow through bonding holes on the metal plate and the other has a desirable wear and strength characteristic necessary for good friction contact with the driving surface. The two compounds are compatible thereby providing maximum adhesion between the compounds. Both compounds preferably use the same phenolic powder resin.

It is therefore an object of this invention to provide an improved process of manufacture for a friction pad wherein two compounds, one having a high fiber content and the other having a high flow characteristic, are layered and compacted in a first mold cavity and then placed in a second mold cavity with a steel insert and subjected to heat and pressure, such that the two compounds will adhere at their interface and the high flow characteristic metal will flow around the steel insert whereby the compounds are firmly bonded together and encase the steel insert.

It is another object of this invention to provide an improved process for the making of a friction pad using a high friction characteristic material and a high flow characteristic material which are compressed in a first mold, placed in a second mold with a metal insert and further compressed under heat and pressure to cause bonding of the two compounds and encasement of the metal insert by the high flow characteristic material.

BRIEF DESCRIPTION OF THE DRAWINGS

These and other objects and advantages of the present invention will be more apparent from the following description and drawings in which:

FIG. 1 is a side elevational view of a friction pad manufactured in accordance with the present invention;

FIG. 2 is a sectional view taken along line 2—2 in FIG. 1;

FIG. 3 is an exploded view of one of the mold structures used with the present invention;

FIG. 4 is a view taken along line 4—4 in FIG. 3;

FIG. 5 is a view taken along line 5—5 in FIG. 3;

FIG. 6 is a view taken along line 6—6 in FIG. 3;

DETAILED DESCRIPTION OF THE DRAWINGS

Figure 7:
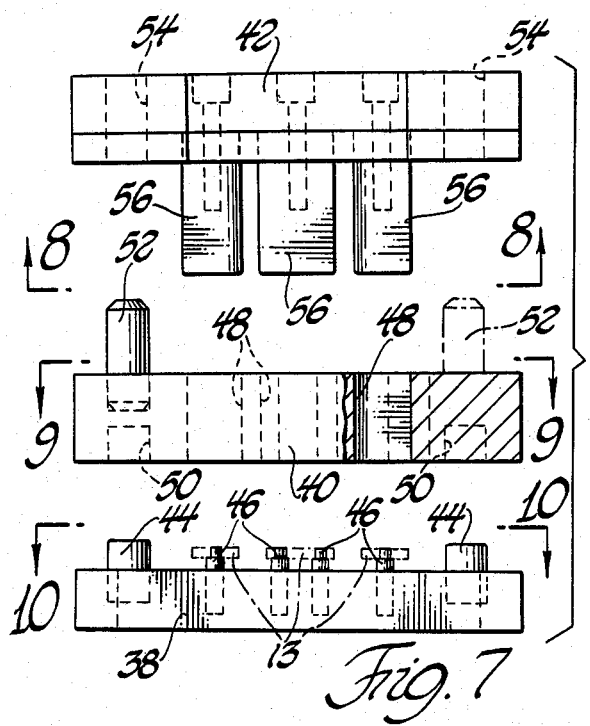
FIG. 7 is an exploded view of another mold used in the present invention.
Figure 10:
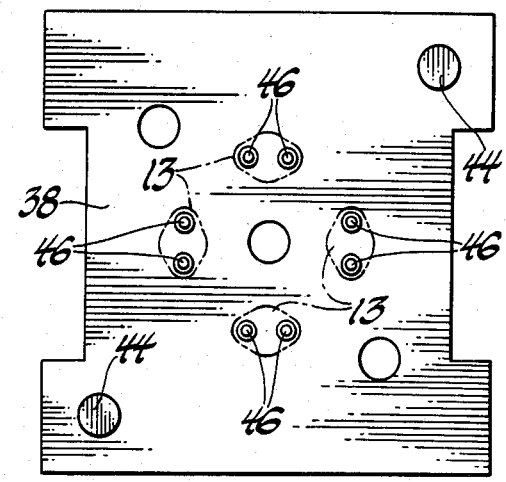
FIG. 10 is a view taken along line 10—10 in FIG. 7.
Figure 8:
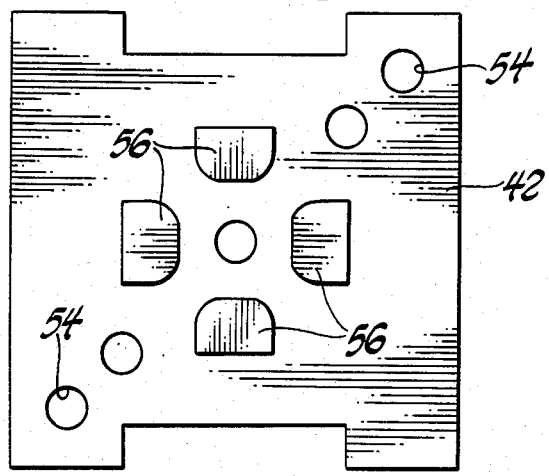
FIG. 8 is a view taken along line 8—8 in FIG. 7.
Figure 9:
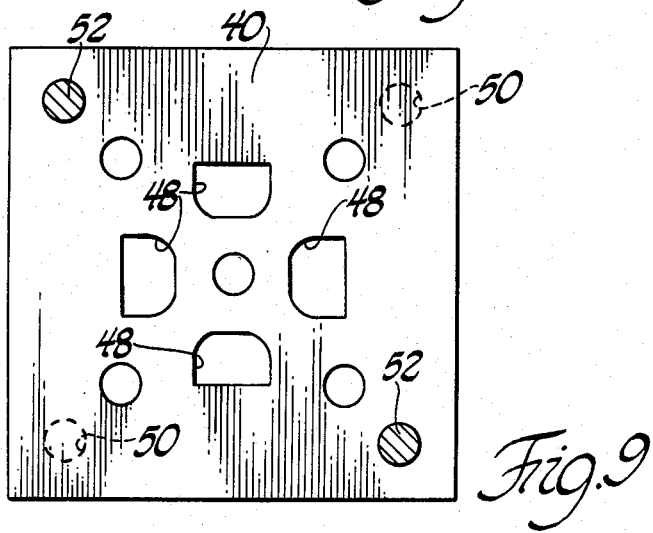
FIG. 9 is a view taken along line 9—9 in in FIG. 7.

Referring to the drawings, wherein like characters represent the same or corresponding parts throughout the several views, there is seen in FIGS. 1 and 2 a friction shoe or pad 10 which is comprised of two compounds 11 and 12, and a metal insert 13. The friction pad 10, as seen in FIG. 2, has three orthogonal surfaces 14, 15 and 16 and an oblique surface 17. The oblique surface 17 is the friction surface which will frictionally engage a pulley member when the friction pad 10 is assembled to a chain, not shown, in a well-known manner. The oblique surface 17 is formed in the compound 11 which is a high friction characteristic compound. The compound 12 is a high flow characteristic compound and, during the process described later, is operable to flow through apertures 18 formed in the metal insert 13 and to also flow around the outer edges of the metal insert 13 thereby encasing the metal insert 13. Two attaching apertures 20 are open through the material 12 to permit the metal insert to be secured to the main body of the chain, not shown.

In FIG. 3, there is seen an exploded view of a mold in which an intermediate component is formed. The mold, shown in FIG. 3, includes a base plate 22, a mold body 24 and a punch or plunger 26. The mold body 24 has a rectangular opening 28 disposed adjacent the base 22 into which a molding stop, not shown, is used during a portion of the preforming operation.

The plunger 26 has a stem portion 30 which, as seen in FIG. 4, has a cross section identical with the outline of the friction pad 10 shown in FIG. 1. The mold body 24 has a central opening or cavity 32 which, as seen in FIG. 6, is complementary to the stem 30 of plunger 26. The base plate 22 has an opening 34 which is preferably larger than the friction pad 10. With the mold body 24 secured by a plurality of threaded fasteners 36 to the base plate 22, and with a molding stop inserted in the space 28, the mold cavity 32 has inserted therein a layer of compound 11 and a layer of compound 12. The punch 26 is inserted into the cavity and is operated on by a press, not shown, to compact the material in the mold cavity 32. After compaction, the molding stop is removed and the molded slug or composite piece is ejected by running the punch completely through the mold cavity 32.

FIG. 7 is an exploded view of the final mold in which the molded slug and the metal insert are formed into a single friction pad. The final mold includes a base plate 38, a mold cavity or spacer 40 and a mold top 42. The mold spacer 40 is aligned on the base plate 38 through a pair of pins 44. The mold base plate 38 has secured therein a plurality of pins 46 which are disposed in pairs to support the metal insert 13, shown in phantom, at a distance above the base plate 38, as seen in FIG. 7. The spacer 40 has four mold cavities 48 which are the shape of the friction pad 10 as seen in FIG. 1. The spacer 40 has apertures 50 into which pins 44 are directed when the spacer 40 is placed on the base plate 38. With the spacer 40 on the base plate 38, the metal inserts 13 will be disposed in the mold cavities 48. The spacer 40 has disposed therein, pin members 52 which are used to align the mold top 42 through apertures 54 formed therein.

The mold top 42 has secured thereto four punches or plungers 56 which are shaped to fit the mold cavities 48. When the mold top 42 is aligned on the pins 52, the punches 56 will be aligned in their respective mold cavities 48. To accomplish the final mold, an insert 13 is placed on each pair of pins 46. The spacer 40 is placed on the base plate 38 and a molded slug, with compound 12 abutting insert 13, is placed in each mold cavity 48 on top of the insert 13. The top mold 42 is placed on the pins 52 and the mold assembly is placed in a press. The top mold 42 is pressed toward the base plate 38 while the mold is simultaneously heated. After a predetermined period of time, the top mold 42 and spacer 40 are removed and the friction pads are removed from post 46 and allowed to cure in an oven. The oblique surface may then be formed on the friction pad, as seen in FIG. 2, or if desired, the punches 56 can be formed with the oblique surface thereby reducing the machining of the friction pads.

Figure 11:
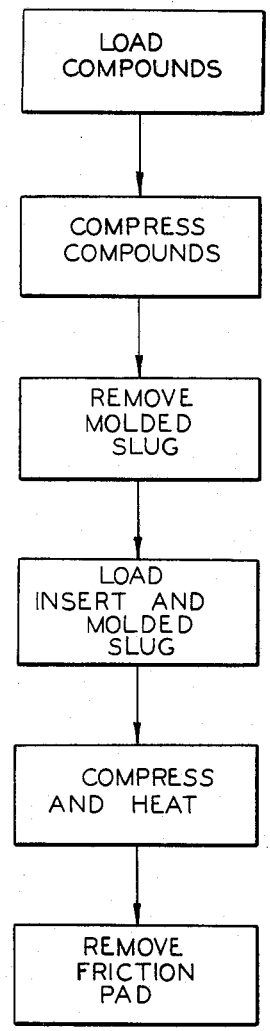
FIG. 11 is a flow diagram of the process steps used in the present invention.

FIG. 11 is a flow diagram representing the various steps performed during the present invention. These steps include loading the two compounds in layers in cavity 32; compressing the compounds with punch 26; removing the molded slug; placing an insert and molded slug in cavities 48; compressing and heating the mold cavities 48 and then removing the friction pad from the mold cavities 48.

The compound 12 is designed for hot flow in the molding operation to allow free flowing during the final molding operation. This compound is preferably comprised of a dry phenolic powder resin of 16% by weight; an iron oxide in granular and fine powder form of 48% by weight; and Wollastonite mineral fiber in needle form of 36% by weight. The Wollastonite mineral fiber is a reinforcing fiber and is of relatively short length and small diameter. The compound 11 is designed for maximum wear and strength and has the desired coefficient of friction. This compound is typically comprised of a dry phenolic powder resin of 24% by weight; steel fibers of 75% by weight; and aramid fiber of 1% by weight. The steel fibers provide strength and wear characteristics and are typically ¼ inch long. The aramid fiber provides binding and strength.

During the preforming operation using the mold of FIG. 3, the following is the preferred form of practicing the invention: (1) assembling the base plate 22 on the mold body 24; (2) inserting a mold stop into opening 28; (3) filling the mold cavity with 5.5 grams of compound 11 and 1.5 grams of compound 12 in separate layers; (4) inserting punch 26 into the mold cavity; (5) pressing the material in the mold cavity until it is approximately 11/16 inches long; and (6) removing the mold stop and eject the molded slug. The final molding operation in its preferred form is comprised of the following steps: (1) assembling the mold and preheating to 325° F.; (2) disassembling the mold, placing the inserts 13 on pins 46 in the base plate 38; (3) placing spacer 40 on the base plate 38; (4) inserting a molded slug into each mold cavity with compound 12 resting on the insert 13; (5) placing the mold top 42 in the mold spacer 40; (6) compressing the mold with a pressure of 20,000 psi at a temperature of 325° F. for 15 minutes; and (7) removing the molded friction pads and curing the pads for one hour at 350° in an oven.

When the molded product is cooled, the oblique surface 17 can be finished such that the desired angle is attained. The friction pads can then be assembled on a base chain in a well-known manner to provide a complete friction drive chain.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A method of forming a friction pad for use with a drive chain from a first high fiber content friction compound and second compound having a high flow characteristic, both said compounds having the same resin, and a metal plate to provide structural support in the drive chain; said method comprising:

placing the compounds in two separate individual layers at a ratio of four parts of the first compound and one part of the second compound in a mold cavity;

applying pressure through a plunger to the compounds in the mold cavity to form a composite piece;

removing the composite piece from the mold cavity;

placing a multi-perforate metal plate in a second cavity;

supporting the metal plate in the second cavity on pins disposed in two of the perforations to provide a space between the bottom of the second cavity and the metal plate;

placing the composite piece in the second cavity abutting the metal insert;

applying heat and pressure to the second cavity to cause the second compound to flow through the perforations and around the outer edges of the metal plate to enclose the metal plate in the second compound and to cause the two compounds to be firmly bonded together cooperating with the metal unit to form a friction pad; and removing the friction pad from the second cavity, said support pins leaving openings in said friction pad to permit connection with said metal plate at assembly to the drive chain.

2. A method of forming a friction pad for use with a drive chain from a first high fiber content friction compound and second compound having a high flow characteristic, both said compounds having the same resin, and a metal plate to provide structural support in the drive chain; said method comprising:

placing the compounds in two separate individual layers at a ratio in the range of 3.5 to 4.0 parts of the first compound and 1.0 part of the second compound in a mold cavity;

applying pressure through a plunger to the compounds in the mold cavity to form a molded slug;

removing the molded slug from the mold cavity;

placing a multi-perforate metal plate in a second cavity;

supporting the metal plate in the second cavity on pins disposed in two of the perforations to provide a space between the bottom of the second cavity and the metal plate;

placing the molded slug in the second cavity with the second compound thereof abutting the metal insert;

applying heat and pressure to the second cavity to cause the second compound to flow through the perforations and around the outer edges of the metal plate to enclose the metal plate in the second compound and to cause the two compounds to be firmly bonded together and cooperating with the metal unit to form a friction pad;

removing the friction pad from the second cavity, said support pins leaving openings in said friction pad to permit connection with said metal plate at assembly to the drive chain; and curing the friction pad at an elevated temperature in an oven.

3. A method of forming a friction pad for use with a drive chain from a first high fiber content friction compound and second compound having a high flow characteristic, both said compounds having the same resin, and a metal plate to provide structural support in the drive chain; said method comprising:

placing the compounds at a ratio in the range of 3.5–4.0:1 in two separate layers in a mold cavity;

applying pressure through a plunger to the compounds in the mold cavity;

removing the composite piece from the mold cavity;

placing a perforated metal plate in a second cavity;

supporting the metal plate on pins disposed in the second cavity to provide a space between the bottom of the cavity and the metal plate;

placing the composite piece in the second cavity abutting the metal insert;

applying heat and pressure to the second cavity to cause the second compound to flow through the perforations and around the outer edges of the metal plate to enclose the metal plate in the compounds to form a friction pad; and removing the friction pad from the second cavity, said support pins leaving openings in said friction pad to permit connection with said metal plate at assembly to the drive chain.

4. A method of forming a friction pad for use with a drive chain from a first high fiber content friction compound and second compound having a high flow characteristic, both said compounds having the same resin, and a metal plate to provide structural support in the drive chain; said method comprising:

placing the compounds in two separate layers at a 3.67:1 ratio in a mold cavity;

applying pressure through a plunger to the compounds in the mold cavity;

removing the composite piece from the mold cavity;

placing a perforated metal plate in a second cavity;

supporting the metal plate on pins disposed in the second cavity to provide a space between the bottom of the cavity and the metal plate;

placing the composite piece in the second cavity abutting the metal insert;

applying heat and pressure to the second cavity to cause the second compound to flow through the perforations and around the outer edges of the metal plate to enclose the metal plate in the compounds to form a friction pad; and removing the friction pad from the second cavity, said support pins leaving openings in said friction pad to permit connection with said metal plate at assembly to the drive chain.

* * * * *